United States Patent [19]

Müller et al.

[11] 4,429,245

[45] Jan. 31, 1984

[54] EXTERNAL ROTOR PRODUCTION FOR SYNCHRONOUS HYSTERESIS MOTOR

[75] Inventors: Siegfried Müller, St. Georgen; Günter Wrobel, Villingen, both of Fed. Rep. of Germany

[73] Assignee: Papst Motoren GmbH & Co., KG, St. Georgen, Fed. Rep. of Germany

[21] Appl. No.: 321,632

[22] Filed: Nov. 16, 1981

[30] Foreign Application Priority Data

Nov. 19, 1980 [DE] Fed. Rep. of Germany ....... 3043558

[51] Int. Cl.³ .......................... H02K 5/16; H02K 1/22
[52] U.S. Cl. ..................... 310/261; 72/327;
148/145; 310/42; 310/266
[58] Field of Search ........ 310/67 R, 90, 261, 40 MM, 310/42, 178, 266, 265, 43, 166, 165; 72/327, 334, 27; 164/111, 67 R; 29/598; 264/259, 263, 274; 14/120, 145

[56] References Cited

U.S. PATENT DOCUMENTS

| | | | |
|---|---|---|---|
| 558,271 | 4/1896 | Falk | 164/111 |
| 1,200,593 | 10/1916 | Currie | 72/327 |
| 1,651,111 | 11/1927 | Winter | 72/327 |
| 2,321,085 | 6/1943 | Hubbard | 72/327 |
| 3,002,118 | 9/1961 | Papst | 310/67 R |
| 3,079,645 | 3/1963 | Cosmos | 264/259 |
| 3,786,290 | 1/1974 | Papst et al. | 310/67 |
| 4,088,729 | 5/1978 | Sherman | 264/263 |
| 4,130,770 | 12/1978 | Wrobel | 310/67 R |

FOREIGN PATENT DOCUMENTS

| | | | |
|---|---|---|---|
| 801468 | 7/1936 | France | 164/111 |
| 72487 | 7/1947 | Norway | 164/111 |
| 905632 | 9/1962 | United Kingdom | 310/67 |

*Primary Examiner*—J. D. Miller
*Assistant Examiner*—D. L. Rebsch
*Attorney, Agent, or Firm*—Horst M. Kasper

[57] ABSTRACT

An external rotor electric synchronous hysteresis motor. A stator provides a rotating electromagnetic field. The hysteresis ring is formed by a deep-drawn rotation symmetrical steel rotor pot having a jacket part for surrounding the stator coaxially and having a bottom part which is provided with a center hole. An end shield is cast into the bottom part of the rotor pot. A shaft is set into the end shield for supporting the rotary motion of the rotor pot.

The rotor pot can be deep-drawn from a steel plate into a molded pot blank, the molded pot blank can be machined to a finished rotor pot, the rotor pot can be heated to a temperature from 750° C. to 900° C. in an inert atmosphere and the jacket part of the rotor pot can be quenched by lowering the same into a cold oil bath under continuous rotation.

20 Claims, 2 Drawing Figures

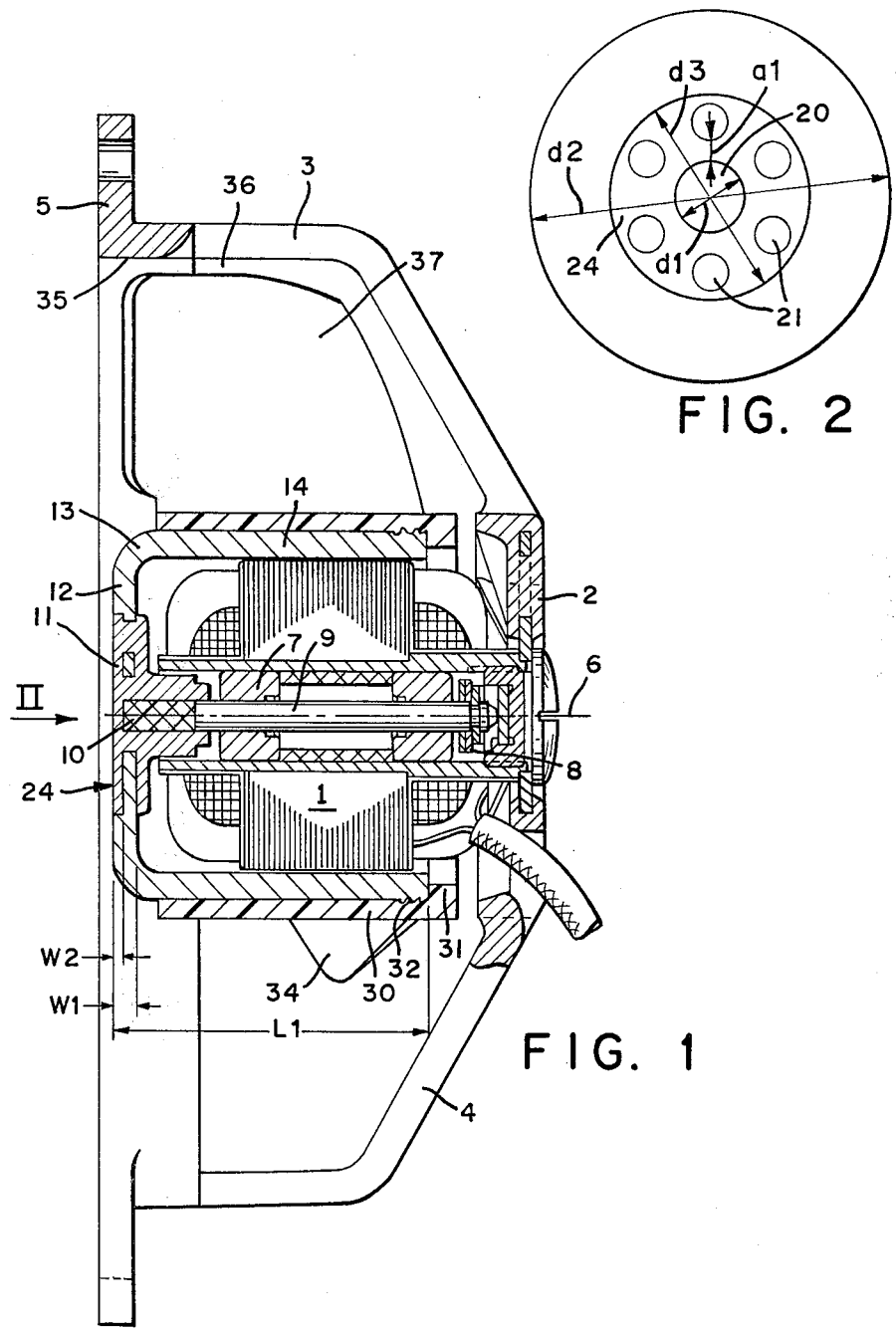

EXTERNAL ROTOR PRODUCTION FOR SYNCHRONOUS HYSTERESIS MOTOR

DESCRIPTION

BACKGROUND OF THE INVENTION

1. Field of the Invention

The present invention relates to an external rotor small electric motor having a rotor jacket of hardened steel as a hysteresis ring surrounding the stator.

2. Brief Description of the Background of the Invention Including Prior Art

In a conventional motor of this type an end shield is provided for the rotor shaft attachment at the front side of the rotor, and at the front side of the rotor a soft iron support is provided for the end shield in order to assure that the desired cylinder symmetrical interaction of the hysteresis ring is not affected by hysteresis effects resulting unsymmetrically from this front side region and interacting disadvantageously. Surprisingly, however, it was found that such axial dissymmetry results in little noticeable decrease in the performance of external rotor small electrical motors, if one considers as small electrical motors such motors having a power input of less than about 30 watts and having an outer diameter and an axial length of the hysteresis ring of less than about 8 cm.

SUMMARY OF THE INVENTION

1. Purposes of the Invention

It is an object of the present invention to provide a one piece rotor pot for an external rotor electrical motor.

It is a further object of the present invention to simplify the production of external rotor electric motors.

It is another object of the present invention to provide external rotor pots having a hardened steel jacket and a relatively soft magnetic bottom part of the rotor pot.

These and other objects and advantages of the prsent invention will become evident from the description wich follows.

2. Brief Description of the Invention

The present invention provides an external rotor electric motor which comprises a stator providing a rotating electromagnetic field, a deep-drawn rotation symmetrical rotor pot of steel having a jacket part being the hysteresis ring and surrounding coaxially the stator and having a bottom part, which is provided with a center hole, an end shield attached to the bottom part of the rotor pot, and a shaft attached to the end shield for supporting the rotary motion of the rotor pot.

The center hole can be a circular hole having a diameter $d_1$ of 0.1 to 0.3 times the outer diameter $d_2$ of the rotor pot and preferably of 0.15 to 0.25 times the diameter $d_2$ of the rotor pot. The bottom of the rotor pot can comprise a circular string of holes disposed around the center hole, which holes have a distance from the center hole al of equal to 0.5 to 1.5 times the wall thickness of the bottom of the rotor pot. The outer side of the bottom of the rotor pot can be provided with a recess extending over the center hole and the string of holes, which recess can have a depth $t_1$ of 0.45 to 0.55 times the wall thickness $w_1$ of the bottom of the rotor pot. The outer diameter $d_3$ of the recess can be equal to 0.4 to 0.6 times the outer diameter $d_2$ of the rotor pot. The end shield can be an injection molded part joining the outside of the bottom of the rotor pot at the outer diameter of the recess and filling the string of holes and the center hole. The wall thickness $w_1$ of the parts of the bottom of the rotor pot surrounding the recess can be as thick as from about 0.9 to 1.1 times the wall thickness $w_2$ of the rotor jacket.

The diameter $d_2$ of the rotor pot can be from 1.5 to 8 cm and the axial length of the rotor pot can be from 1.5 to 8 cm. Preferably the diameter $d_2$ of the rotor pot is from about 2 to 5 cm and the axial length of the rotor pot is from 2 to 5 cm. The rotor pot can comprise a steel including the following minor components:

0.95 to 1.1 weight percent carbon,
0.15 to 0.35 weight percent silicon,
0.25 to 1.1 weight percent manganese,
1.35 to 1.65 weight percent chromium,
0 to 0.03 weight percent phosphorus,
0 to 0.025 weight percent of sulfur and
0 to 2.0 weight percent molybdenum.

Preferably the steel of the rotor pot includes the following minor components:

0.95 to 1.05 weight percent carbon,
0.25 to 0.35 weight percent silicon,
0.25 to 0.35 weight percent manganese, and
1.45 to 1.55 weight percent chromium.

The end of the shaft can be provided at its circumference with knurls such as cross-knurls and can be molded with this end into the end shield.

A tubular hub of a fan wheel can be positively pressed over the rotor jacket of the rotor pot up to a limit stop and can be solidly connected via saw tooth grooves provided at the outside of the jacket of the rotor pot, which grooves dig into the hub of the fan wheel. The jacket of the rotor pot can be of hardened steel or alternatively the full rotor pot can be of hardened steel.

There is further provided a method for production of a rotor pot for an external rotor synchronous hysteresis motor which comprises deep-drawing a steel plate of a composition including the following minor components 0.95 to 1.1 weight percent carbon,
0.15 to 0.35 weight percent silicon,
0.25 to 1.1 weight percent manganese,
1.35 to 1.65 weight percent chromium,
0 to 0.03 weight percent phosphorus,
0 to 0.025 weight percent sulfur and 0 to 2.0 weight percent molybdenum into a molded pot blank, cutting the molded pot blank to a finished rotor pot, heating the rotor pot to a temperature of about 750° C. to 900° C. in an inert atmosphere, and quenching the jacket part of the rotor pot by lowering said jacket part into a cold oil bath under continuous rotation around its symmetry axis. Alternatively, the complete rotor pot may be quenched.

Knurls such as cross-knurls can be provided at the end of the rotor shaft, the rotor shaft and the rotor pot can be placed into their desired final relative positions, and an end shield can be injection molded to the bottom of the rotor pot and simultaneously to the knurled end of the rotor shaft. A hub supporting fan blades can be attached to the outside of the rotor pot.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing in which is shown one of the various possible embodiments of the present invention;

FIG. 1 is a view of a schematic partial section of an axial small fan provided with an external rotor small type motor of the present invention, FIG. 2 is a view of a schematic diagram of the bottom of the rotor pot as seen along arrow II of FIG. 1.

DESCRIPTION OF INVENTION AND PREFERRED EMBODIMENTS

In accordance with the present invention the production of an external rotor electric motor is simplified by providing a motor including a deep-drawn cylinder-symmetrical pot comprising hardened steel as a rotor and the jacket of the pot is the hysteresis ring and the bottom of the pot is provided with a center hole into which an end shield is inserted and filled in.

This way a rotor blank can be obtained within the range of allowable tolerances solely by deep-drawing, which already provides the final basic form. The invention method employs this situation and is characterized by deep-drawing a pot blank from a steel plate including the minor components of 0.95 to 1.1 weight percent carbon, 0.15 to 0.35 weight percent of silicon, 0.25 to 1.1 weight percent of manganese, 1.35 to 1.65 weight percent of chromium, 0 to 0.3 weight percent of phosphorus 0 to 0.25 weight percent of sulfur and 0 to 2.0 weight percent molybdenum. The pot blank is then cut to the final rotor pot and then at a temperature of 750° C. to 900° C. and preferably at a temperature of 800° C. to 850° C. annealled in an inert atmosphere and then quenched by lowering under continuous rotation around the symmetry axis into a cold oil bath.

Advantageously the finished rotor pot is connected to the rotor shaft via an end shield for which a center hole and a centered recess is provided in the bottom of the rotor pot. Such a recess can be easily produced during the deep-drawing by forming the pot blank with a recess at the place for the desired recess. The material excess resulting therewith at the other side of the bottom can be removed during the following cutting and machining.

The device unit comprising the rotor pot, the rotor shaft and the end shield can be simply produced by providing one end of the rotor shaft with knurls, then the rotor pot and the rotor shaft are placed in their desired final relative position and the end shield is die cast to the bottom of the rotor pot and simultaneously to the knurled end of the rotor shaft.

The motor produced in accordance with the present invention is characterized by an extraordinary mechanical stability.

The hystersis properties in the bottom region can be reduced or completely avoided by hardening after the deep-drawing not the complete pot but only the jacket parts of the pot. A border region of the hardening process results, which advantageously is placed in the area of the outer parts of the bottom in order for the jacket to be hardened completely, as is desirable for an optimal power yield of the motor.

Referring now to FIG. 1, the stator is designated as 1 and the stator is attached at its front to the shield 2, which in turn is connected to a ring shaped mounting flange 5 via several ribs 3, 4 distributed over the circumference. A rotor shaft 9 is rotatably disposed coaxially to the axis 6 of the stator 1 in a shaft bearing 7 and assured against axial displacement by the position restraining provision 8. The free end of the shaft is provided at its circumference with a cross-knurling 10. An end shield 11 is die cast as a zinc pressure die cast part, which is die cast into the bottom 12 of the rotor pot 13. The rotor pot 13 is deep-drawn and of a cylindrical form and comprises hardened steel including the minor components as follows: 0.95 to 1.1 weight percent of carbon and preferably 0.95 to 1.05 weight percent carbon, 0.15 to 0.35 weight percent silicon and preferably 0.25 to 0.35 weight percent silicon, 0.25 to 1.1 weight percent manganese and preferably 0.25 to 0.35 weight percent manganese, 1.35 to 1.65 weight percent chromium and preferably 1.45 to 1.55 weight percent chromium, 0 to 0.03 weight percent phosphorus, 0 to 0.025 weight percent sulfur and 0 to 2.0 weight percent molybdenum.

The jacket 14 of the rotor pot 13 provides a hysteresis ring for the motor and the parts of the bottom of the pot surrounding the end shield 11 comprise also hysteresis material; however this does not result in a noticeably disadvantageous effect on the function of the motor.

The bottom 12 is provided with a center hole 20 and six circular holes 21 surround the center hole and are uniformly distributed over the circumference. Instead of the round holes 21 there can also be provided for example three rectangular holes, which are correspondingly uniformly distributed over the circumference. At 24 is provided a central recess at the outside of the bottom 12, which extends over the holes 21 and also over the center hole 20 and which recess extends to about half the thickness of the wall w1 of the bottom and which offers space for the parts of the end shield 11 disposed toward the outside, which adjoin smoothly here with the outer surface of the bottom 12. Furthermore, the die cast end shield 11 permeates the holes 21 and the center hole 20. Thus the end shield is solidly attached to the rotor pot.

A tubular ring 30 of plastic is stuck onto the rotor pot 13 up to the limit stop at the edge 31, where the radially protruding edge 31 fixes the position of the ring 30 in one axial direction and where the saw tooth shaped grooves 32 in the pot 13, which grip into the plastic, fix the other axial direction matchingly.

Four fan blades 34 are attached to the outside of the ring 30 and are uniformly distributed over the circumference of the ring 30 and they form together with the ring 30 a fan wheel 37, which finds suitable space in the central opening 35 of the mounting flange 5 leaving a required circular edge slot 36 when referred to the diameter.

Some of the dimensions of the motor are designated in the drawing in part as double arrows as follows:

| | |
|---|---|
| Distance of the holes 21 from the center hole 20 | a1 |
| Diameter of the center hole 20 | d1 |
| Ouside diameter of the pot 13 | d2 |
| Diameter of the recess 24 | d3 |
| Axial length of the pot | L1 |
| Depth of the recess 24 | t1 |
| Wall thickness of the bottom of the pot 12 | w1 |
| Wall thickness of the jacket 14 | w2 |

Advantageously the following mutual dimensional relationships are observed for the sizes of the components:

a1 = w1 ± 50 percent
d1 = 0.1 to 0.33, preferably 0.2, times d2
d3 = 0.5 times d2 ± 20 percent
L1 = 1.5 to 8 cm and preferably 3 cm
t1 = 0.5 times w1 ± 10 percent
w1 = w2 ± 10 percent These sizes can be recognized for the embodiment shown in the drawing and for several additional embodiments set forth in the following table 1. In addition, table 1 contains further data for the corresponding embodiments. The embodiments 2 to 7 of table 1 distinguish from embodiment 1, which is shown in FIGS. 1 and 2, substantially only by the differing data given in the table 1. The drawing in FIGS. 1 and 2 therefore is substantially also applicable to the embodiments 2 to 7.

TABLE 1

| Embodiment | 1 | 2 | 3 | 4 | 5 | 6 | 7 |
|---|---|---|---|---|---|---|---|
| Length(mm) | | | | | | | |
| a1 | 2.5 | 2.3 | 2.5 | 2.5 | 2.4 | 2.5 | 2.3 |
| d1 | 6.0 | 5.8 | 6.0 | 6.0 | 5.9 | 6.0 | 5.8 |
| d2 | 30.0 | 28.0 | 30.0 | 30.0 | 29.0 | 30.0 | 28.0 |
| d3 | 16.0 | 14.0 | 16.0 | 16.0 | 15.0 | 16.0 | 14.0 |
| L1 | 30.0 | 28.0 | 30.0 | 30.0 | 29.0 | 30.0 | 28.0 |
| t1 | 1.0 | 1.1 | 1.0 | 1.0 | 1.0 | 1.0 | 1.1 |
| w1 | 2.0 | 2.1 | 2.0 | 2.0 | 2.0 | 2.0 | 2.1 |
| w2 | 2.0 | 2.1 | 2.0 | 2.0 | 2.0 | 2.0 | 2.1 |
| Power input (watt) | 15 | 12 | 15 | 15 | 15 | 15 | 12 |
| Minor components of steel of pot in weight percent: | | | | | | | |
| C (carbon) | 1.0 | 1.0 | 1.05 | 1.0 | 1.0 | 0.95 | 1.1 |
| Si (silicon) | 0.3 | 0.3 | 0.25 | 0.25 | 0.3 | 0.15 | 0.35 |
| Mn (manganese) | 0.3 | 0.3 | 0.35 | 1.10 | 0.3 | 0.25 | 0.4 |
| Cr (chromium) | 1.5 | 1.8 | 1.05 | 1.55 | 1.5 | 1.35 | 1.65 |
| Mo (molybdenum) | 0.0 | 2.0 | 0.0 | 0.0 | 0.0 | 0.0 | 0.0 |
| P (phosphorus) | for all embodiments less than 0.03 percent | | | | | | |
| S (sulfur) | for all embodiments less than 0.025 percent | | | | | | |
| Maximum temperat. during hardening (°C.) | 830 | 780 | 850 | 860 | 830 | 900 | 750 |
| Atmosphere during hardening | Argon | Helium | Argon | Argon | Argon | He | Argon |

EXAMPLE 1

A cylindrical pot blank is deep-drawn from plate steel of a wall thickness 3 mm and including minor components C=1%, Si=0.3%, Mn=0.3%, Cr=1.5%, P less than 0.03% and S less than 0.025% for production of the rotor pot 13. The pot blank produced this way is provided with the desired outer dimensions having the required tolerances, such that reworking to meet the tolerances is not required. It is only necessary to machine the center hole 20, the string of holes 21 and the recess 24 at the bottom 12 and to provide along the pot rim recesses or grooves 32 and possibly deburring, trimming and smoothing with a cutting tool. Then the pot is heated and annealed in an inert atmosphere such as argon to a temperature and then hardened by quenching into an oil bath at about 30° C. For quenching, the pot blank is placed on a vertical helix dipping into the oil bath and under rotation the pot is on a spiral path slowly moved down and thereby slowly immerses into the oil bath. By way of the rotation motion the quenching in the oil bath is uniformly distributed over the complete pot blank and therby distortions are avoided.

For production of the other embodiments according to the table, the hardening temperatures according to the table 1 are employed and in the embodiments 2 and 6 helium was employed as a protective gas instead of argon. Otherwise, the production of the rotor pots according to the embodiments 2 to 7 can be performed under meeting the data shown in the table 1 in accordance with the Example 1.

EXAMPLE 2

Instead of producing the center hole 24 by cutting, the center hole can also be produced as a recess during the deep-drawing of the rotor pot. The protrusion thereby generated at the inner side of the bottom of the pot is milled away by cutting. Otherwise the production is performed as indicated in Example 1.

EXAMPLE 3

This example is performed as Example 2 with the only difference being that the protrusion generated at the inner side of the bottom of the pot is left standing. The rotor pot produced this way distinguishes from the rotor pot shown in FIG. 1 based on this protrusion.

EXAMPLE 4

For connecting the rotor pot 13 to the rotor shaft 9 a cross-knurling 10 is milled in at the end of the rotor shaft and the rotor shaft is put in proper position relative to the finished rotor shaft 13. Then the end shield 11 is die cast, which shield thereby permeates the bottom 12 and surrounds the end of the rotor shaft and thus attaches rotor pot and rotor shaft to each other.

It will be understood that each of the elements described above, or two or more together, may also find a useful application in other types of system configurations and other electrical motors and motor production procedures differing from the types described above.

While the invention has been illustrated and described as embodied in the context of an external rotor synchronous hysteresis motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. External rotor electric motor comprising a stator providing a rotating electromagnetic field; a deep-drawn rotation symmetrical rotor pot of steel having a jacket part being a hysteresis ring and surrounding the stator coaxially and having a bottom part which is provided with a center hole, where the steel of the rotor pot includes the following minor components:
   0.95 to 1.1 weight percent carbon,
   0.15 to 0.35 weight percent silicon,
   0.25 to 0.4 weight percent manganese,
   1.35 to 1.65 weight percent chromium;
   an end shield die cast into the bottom hole of the rotor pot; and
   a shaft set into the end shield for supporting the rotary motion of the rotor pot.

2. The external rotor electric motor according to claim 1 wherein the center hole is a circular hole having a diameter d1 of from about 0.1 to 0.3 times the outer diameter d2 of the rotor pot.

3. The external rotor electric motor according to claim 2 wherein the bottom of the rotor pot comprises a circular string of holes disposed around the center hole, which holes have a distance from the center hole a1 equal to from about 0.5 to 1.5 times the wall thickness of the bottom of the rotor pot.

4. The external rotor electric motor according to claim 2 wherein the center hole has a diameter d1 of from about 0.15 to 0.25 times the diameter d2 of the rotor pot.

5. The external rotor electric motor according to claim 3 where the outer side of the bottom of the rotor pot is provided with a recess extending over the center hole and the string of holes, which recess has a depth t1 of from about 0.45 to 0.55 times the wall thickness w1 of the bottom of the rotor pot.

6. The external rotor electric motor according to claim 5 wherein the outer diameter d3 of the recess amounts to from about 0.4 to 0.6 times the outer diameter d2 of the rotor pot.

7. The external rotor electric motor according to claim 5 wherein the end shield is an injection molded part joining the outside of the bottom of the rotor pot at the outer diameter of the recess and filling the string of holes and the center hole.

8. The external rotor electric motor according to claim 5 wherein the wall thickness w1 of the parts of the bottom of the rotor pot surrounding the recess is from about 0.8 to 1.0 times the wall thickness w2 of the rotor jacket.

9. The external rotor electric motor according to claim 1 wherein the diameter d2 of the rotor pot is from about 1.5 cm to 8 cm and wherein the axial length of the rotor pot is from about 1.5 to 8 cm.

10. The external rotor electric motor according to claim 9 wherein the diameter d2 of the rotor pot is from about 2 cm to 5 cm and wherein the axial length of the rotor pot is from about 2 cm to 5 cm.

11. The external rotor electric motor according to claim 1 where the rotor pot comprises a steel including the following minor components:
   0.95 to 1.1 weight percent carbon,
   0.15 to 0.35 weight percent silicon,
   0.25 to 1.1 weight percent manganese,
   1.35 to 1.65 weight percent chromium,
   0 to 0.03 weight percent phosphorus,
   0 to 0.025 weight percent sulfur and
   0 to 2.0 weight percent molybdenum.

12. The external rotor electric motor according to claim 11 where the rotor pot comprises a steel including the following minor components:
   0.95 to 1.05 weight percent carbon,
   0.25 to 0.35 weight percent silicon,
   0.25 to 0.35 weight percent manganese, and
   1.45 to 1.55 weight percent chromium.

13. The external rotor electric motor according to claim 1 wherein an end of the shaft is provided at its circumference with cross-knurls and molded with the end into the end shield.

14. The external rotor electric motor according to claim 1 further comprising
   a tubular hub of a fan wheel positively pressed over the rotor jacket of the rotor pot up to a limit stop and solidly connected via saw tooth grooves provided at the jacket of the pot, which grooves dig into the hub of the fan wheel.

15. The external rotor electric motor according to claim 1 wherein the jacket of the rotor pot is of hardened steel.

16. The external rotor electric motor according to claim 15 wherein the full rotor pot is of hardened steel.

17. A method for production of a rotor pot for an external rotor synchronous hysteresis motor comprising deep-drawing a steel plate of a composition including the following minor components:
   0.95 to 1.1 weight percent carbon,
   0.15 to 0.35 weight percent silicon,
   0.25 to 1.1 weight percent manganese,
   1.35 to 1.65 weight percent chromium,
   0 to 0.03 weight percent phosphorus,
   0 to 0.025 weight percent sulfur and
   0 to 2.0 weight percent molybdenum into a molded pot blank;
   cutting the molded pot blank to a finished rotor pot;
   heating the rotor pot to a temperature of from about 750° C. to 900° C. in an inert atmosphere; and
   quenching the jacket part of the rotor pot by lowering said jacket part into a cold oil bath under continuous rotation around its symmetry axis.

18. The method for production of a rotor pot according to claim 17 wherein the complete rotor pot is quenched.

19. The method for production of a rotor pot according to claim 17 further comprising
   providing cross-knurls at the end of a rotor shaft;
   placing the rotor shaft and the rotor pot into their desired final relative positions; and
   die casting an end shield to the bottom of the rotor pot and simultaneously to the cross-knurled end of the rotor shaft.

20. The method for production of a rotor pot further comprising
   attaching to the outside of the rotor pot a hub supporting fan blades.